(12) United States Patent
Hu (10) Patent No.: US 11,391,310 B2
(45) Date of Patent: Jul. 19, 2022

(54) INSTALLABLE AND DISMANTLABLE APPARATUS

(71) Applicant: INNOVATIVE AUDIO INTERNATIONAL CO., LTD., Huizhou (CN)

(72) Inventor: Jack Hu, Huizhou (CN)

(73) Assignee: INNOVATIVE AUDIO INTERNATIONAL CO., LTD., Huizhou (CN)

( * ) Notice: Subject to any disclaimer, the term of this patent is extended or adjusted under 35 U.S.C. 154(b) by 13 days.

(21) Appl. No.: 16/939,404

(22) Filed: Jul. 27, 2020

(65) Prior Publication Data

US 2021/0341136 A1 Nov. 4, 2021

(51) Int. Cl.
| | |
|---|---|
| *F16B 2/18* | (2006.01) |
| *F16M 13/02* | (2006.01) |
| *F21V 21/04* | (2006.01) |
| *H04R 1/02* | (2006.01) |

(52) U.S. Cl.
CPC .............. *F16B 2/18* (2013.01); *F16M 13/027* (2013.01); *F21V 21/045* (2013.01); *H04R 1/026* (2013.01)

(58) Field of Classification Search
CPC ........ F16B 2/18; F21V 21/042; F21V 21/045; F21V 21/046; H04R 1/026
See application file for complete search history.

(56) References Cited

U.S. PATENT DOCUMENTS

| | | | | |
|---|---|---|---|---|
| 5,964,523 | A * | 10/1999 | Eversberg | F21V 21/04 362/148 |
| 7,334,767 | B2 * | 2/2008 | Wright | B25B 13/46 248/342 |
| 7,570,778 | B2 * | 8/2009 | Wright | H04R 1/025 181/150 |
| 7,676,045 | B2 * | 3/2010 | Merrey | H04R 1/025 381/87 |
| 7,780,135 | B2 * | 8/2010 | Nelson | H04R 1/025 248/342 |
| 8,256,728 | B2 * | 9/2012 | Wright | H04R 1/025 248/221.11 |
| 8,445,779 | B1 * | 5/2013 | Gretz | H02G 3/123 174/53 |
| 8,485,487 | B2 * | 7/2013 | Cheng | H04R 1/026 248/343 |
| 9,084,046 | B2 * | 7/2015 | Ivey | H04R 1/025 |
| 9,206,968 | B2 * | 12/2015 | Highbridge | F21V 23/008 |

(Continued)

*Primary Examiner* — Eret C McNichols
(74) *Attorney, Agent, or Firm* — WPAT, PC (57) ABSTRACT

An installable and dismantlable apparatus provided by the present invention includes: a load bearing part, a toggle assembly rotatably disposed on the load bearing part and a fixing assembly movably disposed on the load bearing part, and the fixing assembly is driven to move for fixing while the toggle assembly rotates. Through the use together of the load bearing part, the toggle assembly and the fixing assembly, while installed, the toggle assembly rotates and the fixing assembly is driven to move, and then the fixing assembly acts on another part for fixing; while dismantled, only the fixing assembly needs to be pushed towards its initial position, which not only ensures the convenience, reliability and firmness during the installation and fixation, but also saves manpower; and in practical use it is easy to operate and convenient for workers to install and dismantle quickly while ensuring the fixing effect.

8 Claims, 6 Drawing Sheets

(56) References Cited

U.S. PATENT DOCUMENTS

| | | | | |
|---|---|---|---|---|
| 9,479,852 B2* | 10/2016 | Yang | | H04R 1/026 |
| 9,739,465 B1* | 8/2017 | Gretz | | F21S 8/036 |
| 10,171,897 B2* | 1/2019 | Hart | | H04R 1/025 |
| 10,638,840 B2* | 5/2020 | Moro | | A47B 96/07 |
| 10,659,857 B1* | 5/2020 | Hu | | H04R 1/025 |
| 10,728,639 B1* | 7/2020 | Chang | | F16M 13/027 |
| 10,848,844 B2* | 11/2020 | Brousseau | | H04R 1/026 |
| 11,064,275 B2* | 7/2021 | Mai | | H05K 5/0226 |
| 2003/0012017 A1* | 1/2003 | Reggiani | | F21V 21/04 |
| | | | | 362/148 |
| 2004/0179710 A1* | 9/2004 | Farinelli, Jr. | | H04R 1/025 |
| | | | | 381/386 |
| 2008/0158862 A1* | 7/2008 | Wu | | F21S 8/02 |
| | | | | 362/150 |
| 2009/0324004 A1* | 12/2009 | Yang | | H04R 1/025 |
| | | | | 381/395 |
| 2011/0017889 A1* | 1/2011 | Nelson | | H04R 1/026 |
| | | | | 248/229.23 |
| 2011/0180678 A1* | 7/2011 | Liu | | F21V 21/046 |
| | | | | 248/343 |
| 2011/0235342 A1* | 9/2011 | Liang | | F21V 21/04 |
| | | | | 362/364 |
| 2014/0307445 A1* | 10/2014 | Highbridge | | F21V 21/042 |
| | | | | 362/296.01 |
| 2016/0366501 A1* | 12/2016 | Ivey | | H04R 1/026 |
| 2017/0099542 A1* | 4/2017 | Strange | | H04R 1/26 |
| 2018/0058629 A1* | 3/2018 | Hart | | H04R 1/025 |
| 2019/0226637 A1* | 7/2019 | Mai | | F24F 7/007 |
| 2019/0301668 A1* | 10/2019 | Mai | | F24F 13/32 |
| 2020/0049308 A1* | 2/2020 | Mai | | F21V 21/03 |
| 2020/0107089 A1* | 4/2020 | You | | H04R 1/025 |
| 2020/0186902 A1* | 6/2020 | Brousseau | | H04R 1/025 |
| 2020/0291642 A1* | 9/2020 | Mai | | F16B 13/0808 |
| 2021/0341136 A1* | 11/2021 | Hu | | F16M 13/027 |

\* cited by examiner

INSTALLABLE AND DISMANTLABLE APPARATUS

FIELD OF THE DISCLOSURE

The disclosure relates to the field of mechanical structure technologies, and more particularly to an installable and dismantlable apparatus.

BACKGROUND

Products made up of different structural materials can be seen everywhere in daily life, such as tables, stools or panel lights. Among them, it is necessary to use fixing parts to combine two parts together. Common fixing parts include screws, pins, etc. Screws need to be screwed with the aid of a screwdriver, and there are directions which need to be distinguished, which are not only laborious, but also its error rate is high. When pins are installed in internal products, it is not convenient to use, and the reliability and firmness are low. In addition, at present, the existing fixing parts are generally difficult to install and dismantle. In actual use, the operation of the existing fixing parts is not convenient.

SUMMARY

In view of deficiencies in the prior art, the disclosure provides an installable and dismantlable apparatus.

An installable and dismantlable apparatus disclosed in the disclosure includes: a load bearing part, a toggle assembly and a fixing assembly, the toggle assembly is rotatably disposed on the load bearing part, the fixing assembly is movably disposed on the load bearing part, and the toggle assembly is configured for being rotated to drive the fixing assembly to move for fixing.

According to an embodiment of the disclosure, the load bearing part is provided with a receiving groove and a guide groove, the fixing assembly is disposed in the receiving groove, and the fixing assembly is movable along the guide groove.

According to an embodiment of the disclosure, the load bearing part is provided with a first supporting surface, a second supporting surface and a stopping surface, the first supporting surface is cooperative with the second supporting surface to support the fixing assembly, the stopping surface is protruded out from the second supporting surface and configured for stopping the retaining assembly.

According to an embodiment of the disclosure, the toggle assembly includes a rotating part, a transition part and a toggle part, the rotating part is rotatably disposed on the load bearing part through the toggle part, and the transition part is rotatably disposed on the rotating part.

According to an embodiment of the disclosure, the toggle assembly includes a first resetting part, the first resetting part is sleeved on the toggle part, an end of the first resetting part abuts against the load bearing part, and another end of the first resetting part abuts against the rotating part.

According to an embodiment of the disclosure, the rotating part is provided with a placing groove, and the another end of the first resetting part is disposed in the placing groove.

According to an embodiment of the disclosure, an end of the toggle part away from the rotating part is provided with a convex block, and the convex block is configured for acting on the fixing assembly.

According to an embodiment of the disclosure, the fixing assembly includes a fixing part and a second resetting part, the fixing part is disposed in the receiving groove, an end of the second resetting part abuts against a bottom surface of the receiving groove, and another end of the second resetting part abuts against the fixing part.

According to an embodiment of the disclosure, the fixing assembly includes a position limiting part, the position limiting part is disposed between the fixing part and the second resetting part, and the position limiting part abuts against a sidewall of the receiving groove.

According to an embodiment of the disclosure, an end of the fixing part away from the receiving groove is provided with antiskid teeth.

The beneficial effect of the disclosure is that, through the use together of the load bearing part, the toggle assembly and the fixing assembly, while installed, the toggle assembly rotates and drives the fixing assembly to move, and then the fixing assembly acts on another part for fixing; while dismantled, only the fixing assembly needs to be pushed towards its initial position, which not only ensures the convenience, reliability and firmness during the installation and fixation, but also saves manpower; and in practical use it is easy to operate and convenient for workers to install and dismantle quickly under the condition of ensuring the fixing effect.

BRIEF DESCRIPTION OF THE DRAWINGS

Drawings in the description below are used to provide a further understanding of the disclosure, and are a part of the disclosure. The exemplary embodiments of the disclosure and the description thereof are used to explain the disclosure and do not constitute an improper limitation of the disclosure. In the drawings.

LABELS DESCRIPTION IN THE DRAWINGS

1—load bearing part; 11—receiving groove; 12—guide groove; 13—first supporting surface; 14—second supporting surface; 15—stopping surface; 16—abutting bead;

2—toggle assembly; 21—rotating part; 211—placing groove; 22—transition part; 23—toggle part; 231—convex block; 24—first resetting part;

3—fixing assembly; 31—fixing part; 311—antiskid tooth; 32—second resetting part; 33—position limiting part;

4—ceiling;

5—sound equipment.

DETAILED DESCRIPTION OF EMBODIMENTS

Several embodiments of the disclosure will be disclosed with schema below. For clarity, many practical details will be described in the following description. However, it should be understood that these practical details should not be applied to limit the disclosure. That is, in some embodiments of the disclosure, these practical details are unnecessary. In addition, in order to simplify the schema, some familiar structures and components will be shown in a simple schematic way in the schema.

In addition, the descriptions of "first", "second" and so on in the disclosure are only used for description purpose, not specifically referring to the meaning of sequence or order, nor to define the disclosure. There are only for distinguishing components or operations described in the same technical terms, but not for indicating or implying the relative importance or implying the number of indicated technical features. Thus, a feature defined with "first" or "second" may include at least one such feature, either explicitly or implicitly. Additionally, the technical solutions among the embodiments can be combined with each other, but it must be based on the realization of ordinary skilled person in the art. When the combination of the technical solutions is contradictory or cannot be realized, it should be considered that the combination of the technical solutions does not exist, nor is it within the scope of protection required by the disclosure.

Figure 1:
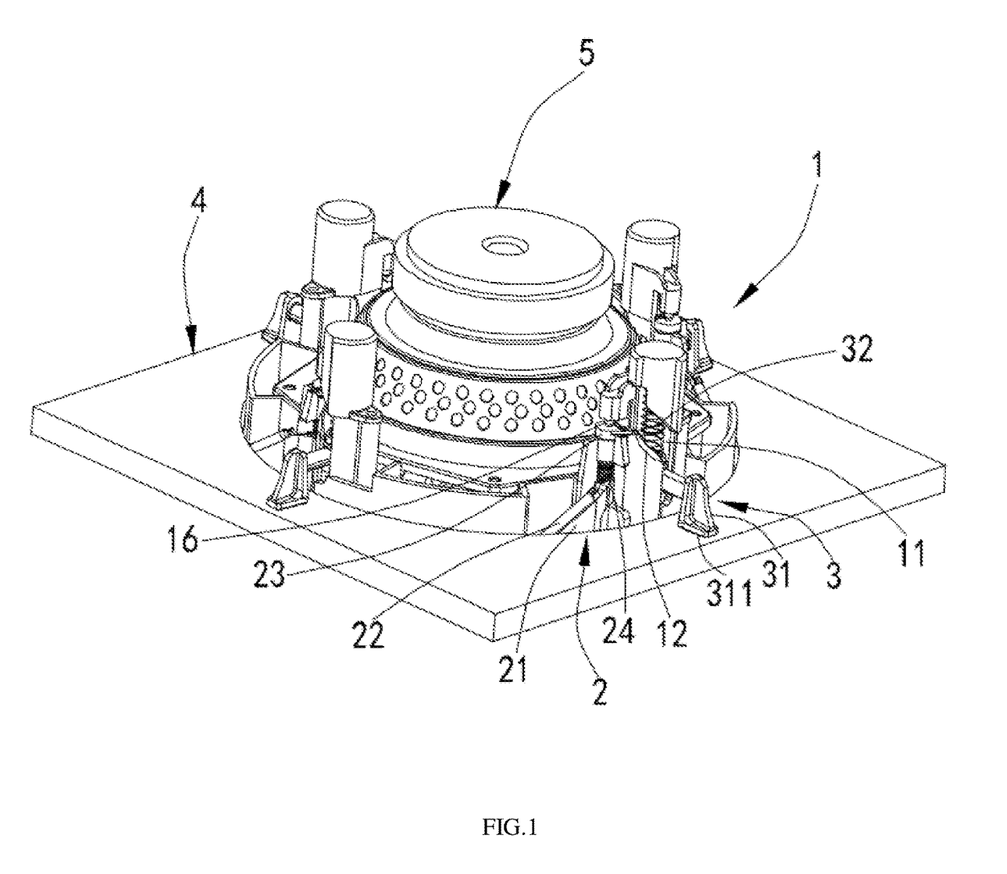
FIG. 1 is a perspective schematic structural view of the installable and dismantlable apparatus according to an embodiment.

As shown in FIG. 1, FIG. 1 is a perspective schematic structural view of an installable and dismantlable apparatus in the embodiment. In this embodiment, it will be explained with the combination of the ceiling equipment as an example, for example a light or sound equipment 5 on the ceiling, specifically, the installable and dismantlable apparatus combined with a sound equipment 5 on the ceiling are taken as an example. The installable and dismantlable apparatus of the disclosure includes a load bearing part 1, a toggle assembly 2 and a fixing assembly 3. The toggle assembly 2 and the fixing assembly 3 are both disposed on the load bearing part 1, the toggle assembly 2 is rotatably disposed on the load bearing part 1, and the fixing assembly 3 is movably disposed on the load bearing part 1. The toggle assembly 2 is configured for being rotated to drive the fixing assembly 3 to move for fixing.

In specific applications, the sound equipment 5 is also disposed on the fixing part 1. Specifically, the fixing part 1 is set to surround the sound equipment 5.

Figure 2:
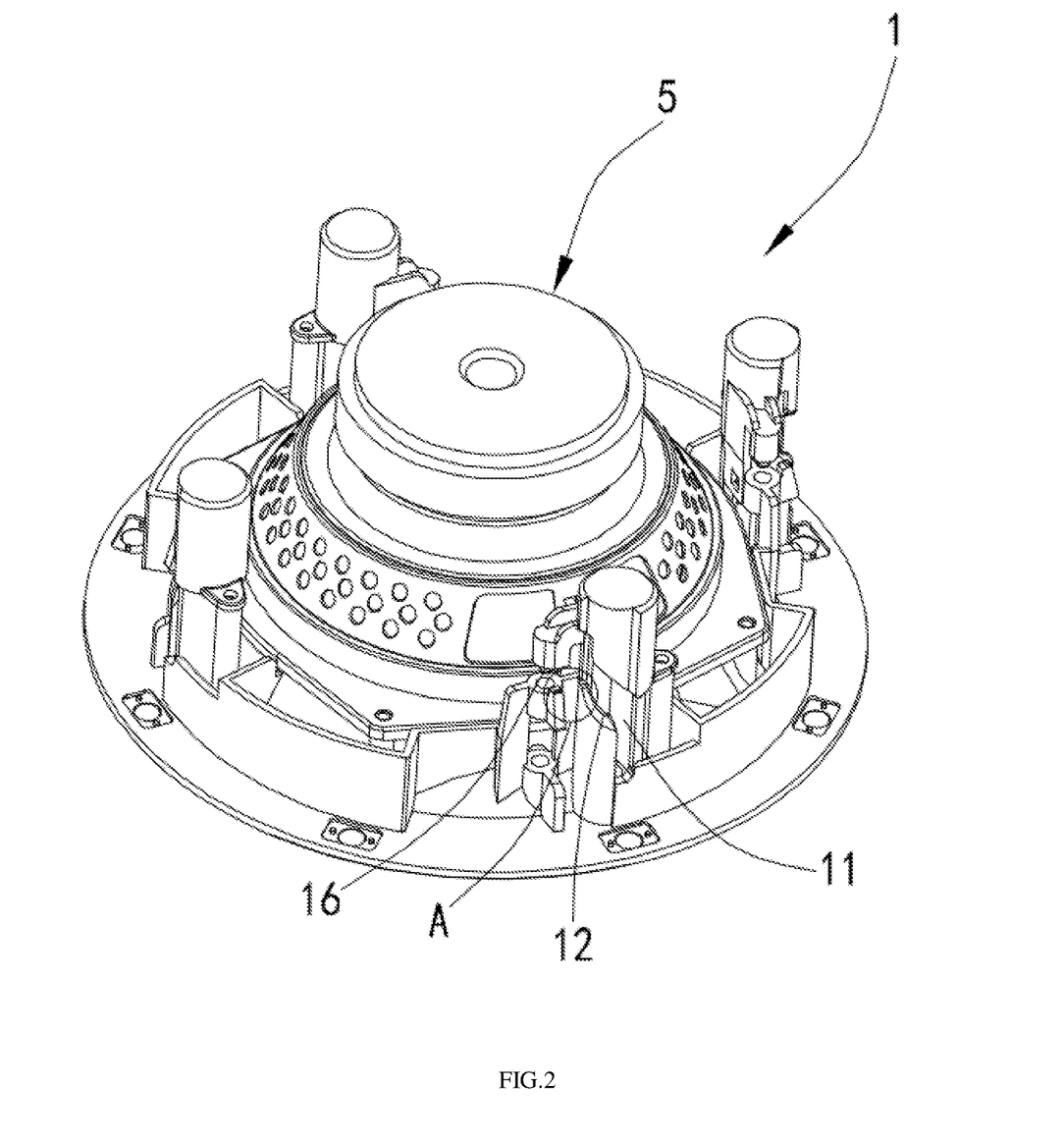
FIG. 2 is a perspective schematic structural view of the load bearing part 1 according to an embodiment.
Figure 3:
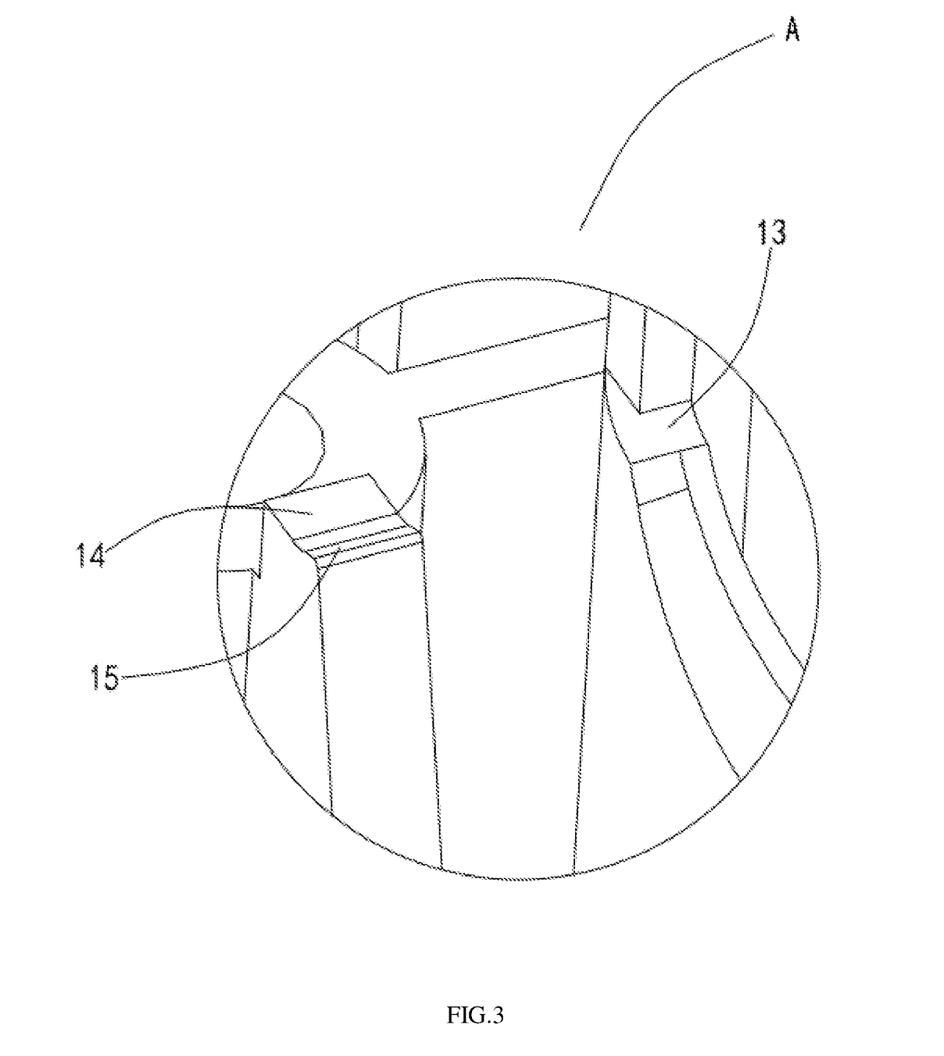
FIG. 3 is a partial enlargement view of A in FIG. 2.

Furthermore, referring to FIG. 2-3, FIG. 2 is a perspective schematic structural view of load bearing part 1 in the embodiment; FIG. 3 is the partial enlargement view of A in FIG. 2. In specific applications, the load bearing part 1 is provided with a receiving groove 11 and a guide groove 12, the fixing assembly 3 is disposed in the receiving groove 11, the fixing assembly 3 is movable along the guide groove 12. The load bearing part 1 is further provided with a first supporting surface 13, a second supporting surface 14 and a stopping surface 15. The first supporting surface 13 is disposed on the guide groove 12, the second supporting surface 14 and the first supporting surface 13 are disposed on the same horizontal plane, the stopping surface 15 is disposed on the second supporting surface 14, and the stopping surface 15 is protruded out from the second supporting surface 14. While in the initial state or dismantling, the first supporting surface 13 and the second supporting surface 14 both abuts against the fixing assembly 3 for supporting, the stopping surface 15 abuts against the fixing assembly 3 to stop the fixing assembly 3 and prevent the fixing assembly 3 from moving along the guide groove 12 in non-working state. Specifically, in order to enhance the stability and firmness of the installable and dismantlable apparatus when installed and used, at least two receiving grooves 11, two guide grooves 12, two the first supporting surfaces 13, two second supporting surfaces 14 and two stopping surfaces 15 are disposed on the bearing part 1. Correspondingly, two toggle assemblies 2 and two fixing assemblies 3 are also provided. In this embodiment, four receiving grooves 11, four guide grooves 12, four first supporting surfaces 13, four second supporting surfaces 14 and four stopping surfaces 15 are disposed around the bearing part 1. Correspondingly, four toggle assemblies 2 and four fixing assemblies 3 are also provided.

Figure 4:
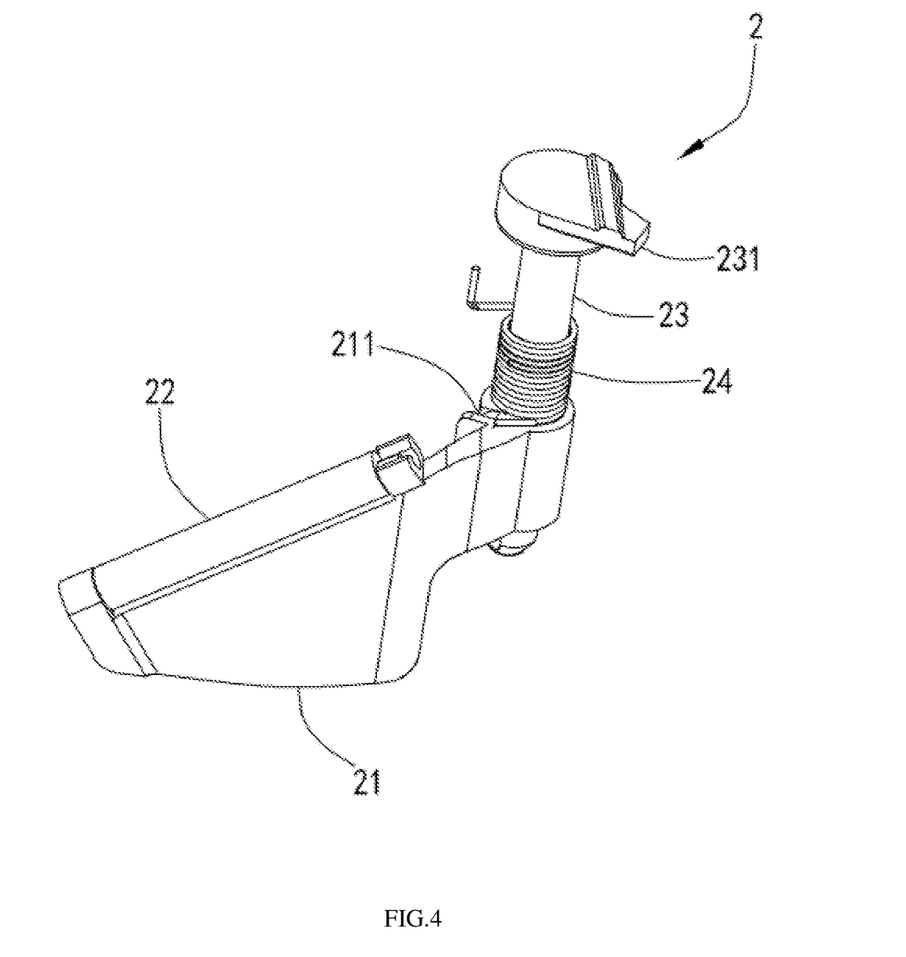
FIG. 4 is a perspective schematic structural view of the toggle assembly 2 according to an embodiment.
Figure 5:
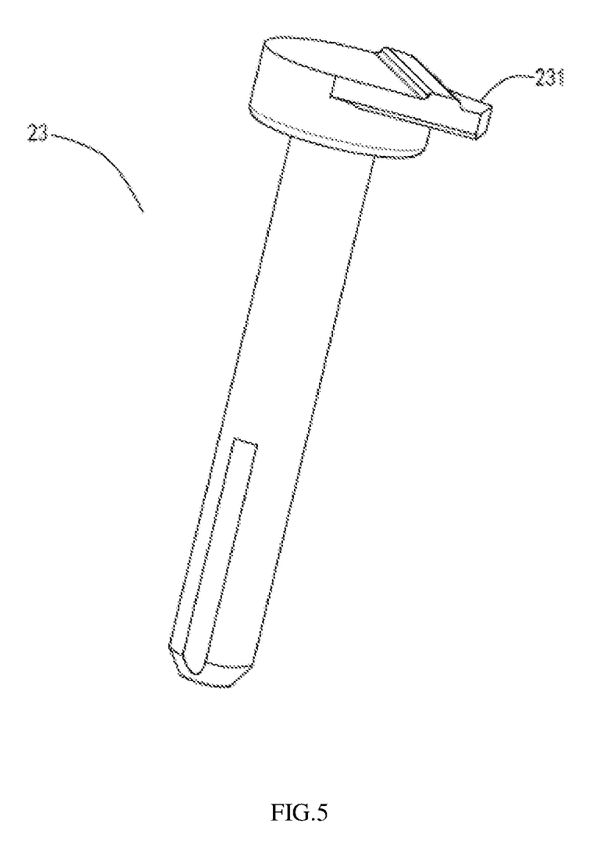
FIG. 5 is a perspective schematic structural view of the toggle part 23 according to an embodiment.

And referring to FIG. 4-5, FIG. 4 is a perspective schematic structural view of the toggle assembly 2 in the embodiment; FIG. 5 is a perspective schematic structural view of the toggle assembly 23 in the embodiment. In specific applications, the toggle assembly 2 includes a rotating part 21, a transition part 22 and a toggle part 23, the rotating part 21 is disposed on an side of the receiving groove 11, an end of the toggle part 23 passes through an end of the rotating part 21, and the end of the toggle part 23 is rotatably disposed on the load bearing part 1, that is, the rotating part 21 is rotatably disposed on the load bearing part 1 through the toggle part 23, and the transition part 22 is rotatably disposed on the end of the rotating part 21 away from the toggle part 23. Preferably, the rotating part 21 is in an arc shape, which is suitable for a circular hole of corresponding size. Specifically, the rotating part 21 is connected with the moving part 23 though a key. Further preferably, an end of the toggle part 23 away from the rotating part 21 is provided with a convex block 231 which acts on the fixing assembly 3. Further preferably, in order to prevent the toggle part 23 from separating in the process of transportation or use, an abutting bead 16 is disposed between the load bearing 1 and an end surface of the toggle part 23, the abutting bead 16 is rotatably disposed on the load bearing 1 and abuts against the end surface of the toggle part 23.

Preferably, the toggle assembly 2 further includes a first resetting part 24, the first resetting part 24 is sleeved on the toggle part 23, and two ends of the first resetting part 24 respectively abuts against the load bearing part 1 and the rotating part 21. In specific applications, the rotating part 21 is provided with a placing groove 211, an end of the first resetting part 24 abuts against the load bearing part 1, and another end of the first resetting part 24 is located in the placing groove 211. Specifically, the first resetting part 24 is a torsion spring.

Figure 6:
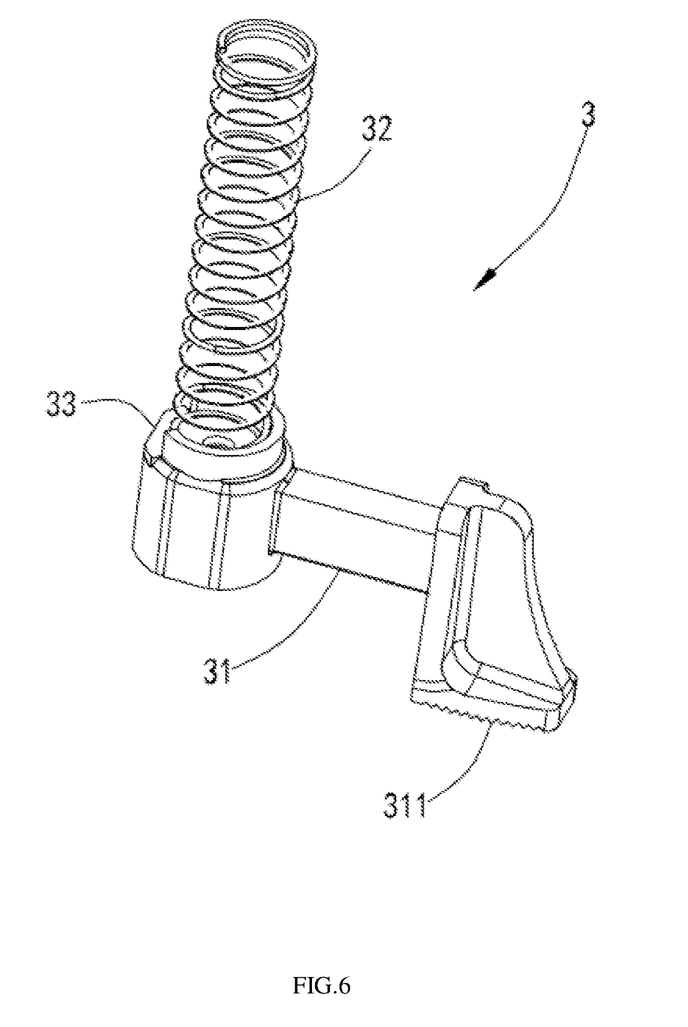
FIG. 6 is a perspective schematic structural view of the fixing assembly 3 according to an embodiment.

Referring to FIG. 6, FIG. 6 is a perspective schematic structural view of the fixing assembly 3 in the embodiment. In specific applications, the fixing assembly 3 includes a fixing part 31 and a second resetting part 32, the fixing part 31 is disposed in the receiving groove 11, and the fixing part 31 can move along the setting direction of the receiving groove 11, an end of the second resetting part 32 abuts against an inner bottom surface of the receiving groove 11, and another end of the second resetting part 32 abuts against the fixing part 31. Preferably, the fixing assembly 3 further includes a position limiting part 33, the position limiting part 33 is located between the fixing part 31 and the second resetting part 32, the position limiting part 33 further abuts against an inner wall surface of the receiving groove 11. Specifically, the position where the position limiting part 33 abuts against the inner wall surface of the receiving groove 11 is in a shape of a middle of cusp and both sides curved. In this embodiment, the second resetting part 32 is a spring.

Further preferably, an end of the fixing part 31 away from the receiving groove 11 is provided with antiskid teeth 311 to increase the roughness of the contact surface between the fixing part 31 and the ceiling 4, so as to increase the friction force and prevent the sliding phenomenon between the fixing part 31 and the ceiling 4.

When the installable and dismantlable apparatus is used, it is directed at an installation hole reserved and pushed inwards. After the transition part 22 abuts against the inner wall of the installation hole, the transition part 22 shrinks towards the direction close to the center of the installation hole. At the same time, the transition part 22 drives the rotating part 21 to rotate. The first resetting part 24 is compressed under the action of the rotating part 21. The rotating part 21 drives the rotating part 23 to rotate. During the rotation of the moving piece 23, the convex block 231 abuts against the fixing part 31, and the fixing part 31 is pushed out of the stopping surface 15, and the second resetting part 32 is in a state of being compressed in the initial state. After the convex block 231 pushes the fixing part 31 to move away from the first supporting surface 13, the second supporting surface 14 and the stopping surface 15, under the action of the elastic force of the second resetting part 32, the fixing part 31 moves along the guide groove 12 and finally acts on interior of the ceiling 4. Since under the interaction force between the limiting piece 33 and the inner wall surface of the receiving groove 11, the fixing part 31 can firmly abut against the ceiling 4.

When the installable and dismantlable apparatus needs to be dismantled, the fixing part 31 is pushed to an end of the receiving groove 11 by an external force, so as to drive the fixing part 31 to return to its initial position. At the same time, the load bearing part 1 is taken out slowly, the rotating part 21, the transition part 22 and the toggle part 23 gradually move towards the initial position, and the load bearing part 1 can be completely taken out after the fixing part 31 abuts against the first supporting surface 13, the second supporting surface 14 and the stopping surface 15.

In summary, through the use together of the load bearing part, the toggle assembly and the fixing assembly, while installed, the toggle assembly rotates and drives the fixing assembly to move, and then the fixing assembly acts on another part for fixing; while dismantled, only the fixing assembly needs to be pushed towards its initial position, which not only ensures the convenience, reliability and firmness during the installation and fixation, but also saves manpower; and in practical use it is easy to operate and convenient for workers to install and dismantle quickly under the condition of ensuring the fixing effect.

The above description is only embodiments of the disclosure and is not used to limit the disclosure. For those skilled in the art, the disclosure may have various changes and variations. Any modification, equivalent replacement, improvement, etc. made in the spirit and principle of the disclosure shall be included in the claims of the disclosure.

What is claimed is:

1. An installable and dismantlable apparatus comprising: a load bearing part (1), a toggle assembly (2) and a fixing assembly (3); wherein the toggle assembly (2) is rotatably disposed on the load bearing part (1), the fixing assembly (3) is movably disposed on the load bearing part (1), and the toggle assembly (2) is configured for being rotated to drive the fixing assembly (3) to move for fixing;

wherein the toggle assembly (2) comprises a rotating part (21), a transition part (22) and a toggle part (23); the rotating part (21) is rotatably disposed on the load bearing part (1) through the toggle part (23), and the transition part (22) is rotatably disposed on the rotating part (21);

wherein the toggle assembly (2) comprises a first resetting part (24), the first resetting part (24) is sleeved on the toggle part (23), an end of the first resetting part (24) abuts against the load bearing part (1), and another end of the first resetting part (24) abuts against the rotating part (21).

2. The installable and dismantlable apparatus as claimed in claim 1, wherein the load bearing part (1) is provided with a receiving groove (11) and a guide groove (12), the fixing assembly (3) is disposed in the receiving groove (11), and the fixing assembly (3) is movable along the guide groove (12).

3. The installable and dismantlable apparatus as claimed in claim 2, wherein the load bearing part (1) is provided with a first supporting surface (13), a second supporting surface (14) and a stopping surface (15); the first supporting surface (13) is cooperative with the second supporting surface (14) to support the fixing assembly (3), the stopping surface (15) is protruded out from the second supporting surface (14) and configured for stopping the fixing assembly (3).

4. The installable and dismantlable apparatus as claimed in claim 2, wherein the fixing assembly (3) comprises a fixing part (31) and a second resetting part (32), the fixing part (31) is disposed in the receiving groove (11), an end of the second resetting part (32) abuts against a bottom surface of the receiving groove (11), and another end of the second resetting part (32) abuts against the fixing part (31).

5. The installable and dismantlable apparatus as claimed in claim 4, wherein the fixing assembly (3) comprises a position limiting part (33), the position limiting part (33) is disposed between the fixing part (31) and the second resetting part (32), and the position limiting part (33) abuts against a sidewall of the receiving groove (11).

6. The installable and dismantlable apparatus as claimed in claim 4, wherein an end of the fixing part (31) away from the receiving groove (11) is provided with antiskid teeth (311).

7. The installable and dismantlable apparatus as claimed in claim 1, wherein the rotating part (21) is provided with a placing groove (211), and the another end of the first resetting part (24) is disposed in the placing groove (211).

8. The installable and dismantlable apparatus as claimed in claim 7, wherein an end of the toggle part (23) away from the rotating part (21) is provided with a convex block (231), and the convex block (231) is configured for acting on the fixing assembly (3).

* * * * *